(12) United States Patent
Chang

(10) Patent No.: US 6,519,023 B1
(45) Date of Patent: Feb. 11, 2003

(54) TRANSPARENCY SCANNING MECHANISM OF A CIS SCANNER

(75) Inventor: Martin Chang, Hsin-Chu (TW)

(73) Assignee: Avision Inc., Hsin-Chu (TW)

(*) Notice: Subject to any disclaimer, the term of this patent is extended or adjusted under 35 U.S.C. 154(b) by 0 days.

(21) Appl. No.: 10/091,184

(22) Filed: Mar. 6, 2002

(30) Foreign Application Priority Data

Oct. 29, 2001 (TW) ...................................... 90218422 U

(51) Int. Cl.$^7$ .......................... G03B 27/00; G03B 27/62; H04N 1/04
(52) U.S. Cl. .......................... 355/18; 358/487; 358/498; 358/506; 358/509; 348/96; 355/71
(58) Field of Search .............................. 355/18, 67, 75; 358/474, 487, 506, 527, 509, 498; 348/96, 97

(56) References Cited

U.S. PATENT DOCUMENTS

| | | | | |
|---|---|---|---|---|
| 5,119,212 A | * | 6/1992 | Mori et al. | 358/474 |
| 5,781,311 A | * | 7/1998 | Inoue et al. | 355/67 |
| 5,898,508 A | * | 4/1999 | Bekanich | 358/474 |
| 5,907,413 A | * | 5/1999 | Han | 358/474 |
| 5,986,774 A | * | 11/1999 | Han | 358/475 |
| 5,993,023 A | * | 11/1999 | Lin | 355/67 |
| 6,151,140 A | * | 11/2000 | Wilcox et al. | 358/498 |
| 6,172,360 B1 | * | 1/2001 | Khovaylo et al. | 250/208.1 |
| 6,185,011 B1 | * | 2/2001 | William | 358/474 |
| 6,389,183 B1 | * | 5/2002 | Han | 358/474 |
| 6,417,937 B1 | * | 7/2002 | Batten et al. | 358/475 |

* cited by examiner

*Primary Examiner*—Alan A. Mathews
(74) *Attorney, Agent, or Firm*—Charles E. Baxley

(57) ABSTRACT

A transparency scanning mechanism of a CIS scanner for scanning a transparency includes a plane light source mounted on the upper cover of the scanner, for projecting the transparency. A guide device is mounted on the upper cover and located adjacent to the plane light source for guiding the transparency to face the plane light source. Thus, the CIS scanner may be used to scan the transparency. The scanning mechanism and the upper cover may be made integrally, thereby decreasing cost of fabrication. In addition, the upper cover may be provided with a driving device and/or a retaining device adjacent to the guide device, to mate with movement of the transparency, so that the transparency may be moved conveniently, thereby preventing the transparency from being tilted and deviated.

11 Claims, 8 Drawing Sheets

TRANSPARENCY SCANNING MECHANISM OF A CIS SCANNER

BACKGROUND OF THE INVENTION

1. Field of the Invention

The present invention relates to a scanner, and more particularly to a transparency scanning mechanism of a CIS scanner (or CCD scanner).

2. Description of the Related Art

Conventional scanners include CCD scanners and CIS scanners. The CCD scanner has a longer view depth (or depth of field) effect, and the CIS scanner has a shorter view depth effect. When scanning the reflective paper, both of the CCD scanner and the CIS scanner may conveniently obtain the image. When scanning the transparency, the CCD scanner has a greater view depth effect, so that the CCD scanner may conveniently obtain the image by a built-in or an additional transparency adapter.

The CIS scanner does not have a built-in transparency adapter. Thus, the CIS scanner needs assistance of an additional transparency adapter. However, the bottom face of the transparency adapter is formed with protruded foot posts. Thus, when the transparency adapter is placed on the CIS scanner, a distance is defined between the bottom face of the transparency adapter and the transparency. However, the view depth of the CIS scanner is about 0.3 mm which is smaller than the distance between the bottom face of the transparency adapter and the transparency. Thus, the transparency adapter mating with the CIS scanner produces a vague image.

However, the CIS scanner has the short, light and thin features, and is the modern product. Thus, the CIS scanner can be used to scan the reflective paper only, and cannot satisfy the requirement of the user.

SUMMARY OF THE INVENTION

The primary objective of the present invention is to provide a transparency scanning mechanism that may be made integrally with the upper cover of a CIS scanner, and may be used for scanning the transparency.

In accordance with one aspect of the present invention, there is provided a transparency scanning mechanism of a CIS scanner for scanning a transparency, comprising:

an upper cover having an outer surface and an inner surface distal to the outer surface;

a plane light source secured on the inner surface of the upper cover, the plane light source having a light permeable face distal to the inner surface of the upper cover; and at least one guide device secured on the inner surface of the upper cover and located adjacent to the plane light source, the at least one guide device having an inclined guide portion for guiding the transparency to the plane light source.

Thus, by guidance of the guide portion of the guide device, the transparency may be rested on the light permeable face of the plane light source. The upper cover may cover the body of the scanner. The light permeable face of the plane light source, the transparency and the glass scanning window may present a smooth resting state, so that the CIS scanner may conveniently scan the transparency to obtain a clear image. In addition, the scanning mechanism and the upper cover may be made integrally, thereby decreasing cost of fabrication.

Further, in the structure of the above-mentioned aspect, the present invention may be provided with a driving device and/or a retaining device, thereby facilitating movement of the transparency, and thereby preventing the transparency from being tilted and deviated.

Further benefits and advantages of the present invention will become apparent after a careful reading of the detailed description with appropriate reference to the accompanying drawings.

DETAILED DESCRIPTION OF THE PREFERRED EMBODIMENTS OF THE INVENTION

Figure 1:
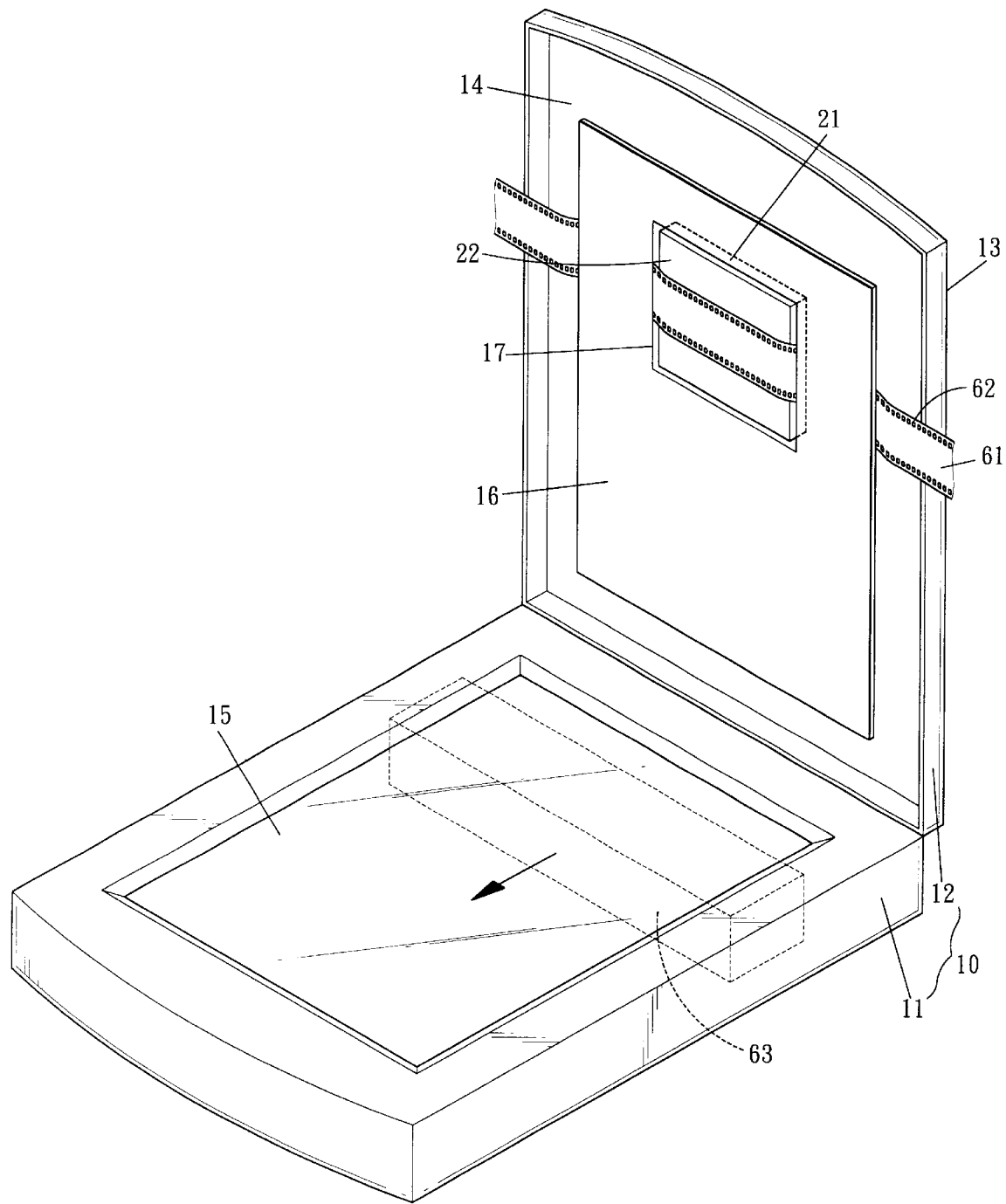
FIG. 1 is a pictorial view of a CIS scanner in accordance with a first embodiment of the present invention.

Referring to the drawings and initially to FIG. 1, a pictorial view of a CIS scanner in accordance with the present invention is shown. The CIS scanner 10 includes a body 11, and an upper cover 12 pivoted on one end of the body 11. The upper cover 12 has a first side formed with an outer surface 13 and a second side away from the outer surface 13 and formed with an inner surface 14. A protective pad 16 is mounted on the inner surface 14. When the upper cover 12 covers the body 11, the inner surface 14 of the upper cover 12 faces the glass window 15 of the body 11, and the protective pad 16 is rested on the surface of the glass window 15 of the body 11.

The inner surface 14 of the upper cover 12 is provided with a plane light source 21. The plane light source 21 has a first side formed with a light permeable face 22, and a second side secured on the inner surface 14 of the upper cover 12. It is appreciated that, the protective pad 16 mounted on the inner surface 14 of the upper cover 12 is formed with a through window 17. After the plane light source 21 is secured, the light permeable face 22 of the plane light source 21 aligns with the window 17, and is not protruded outward from the peripheral surface of the window 17.

Figure 2:
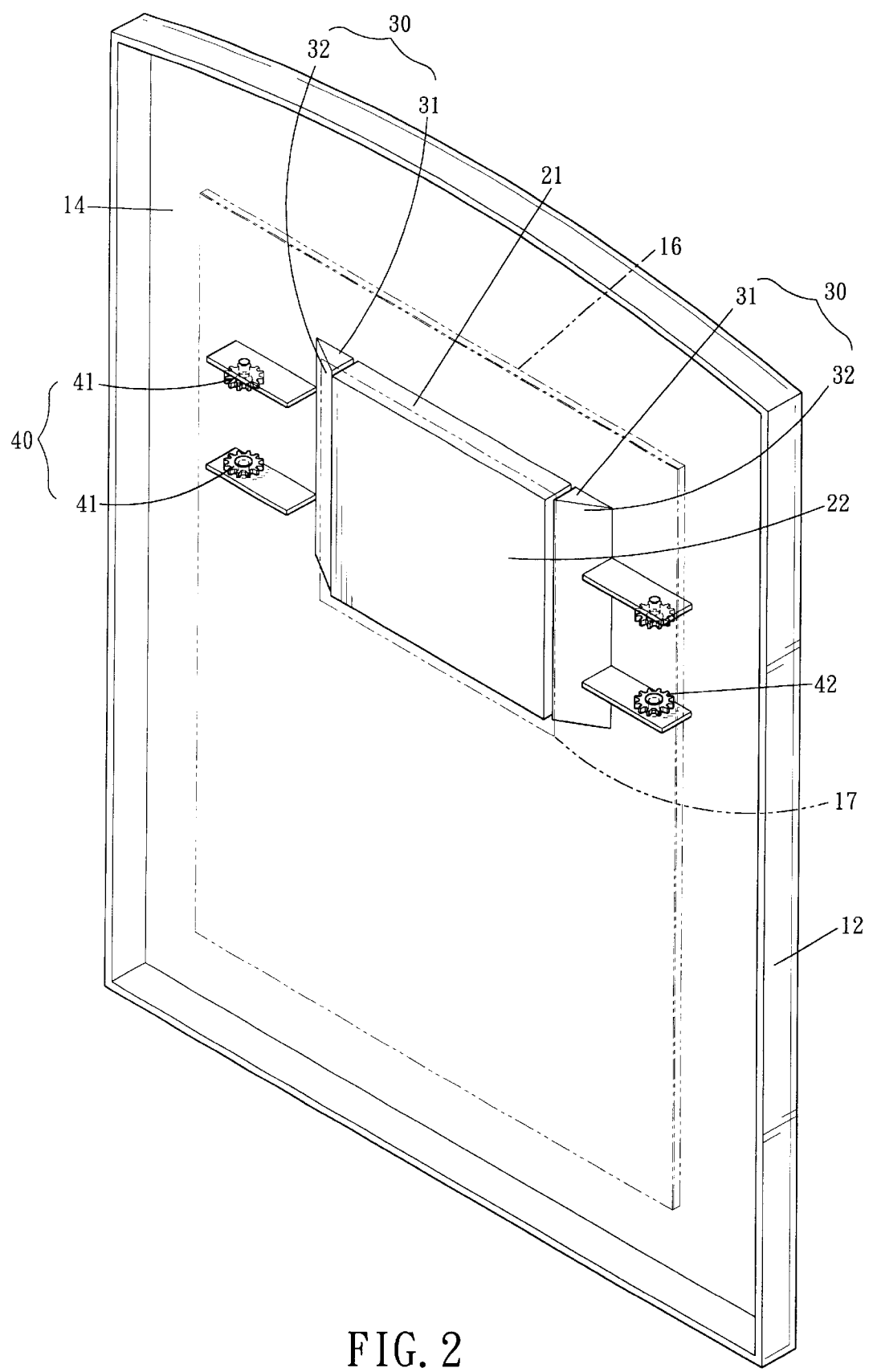
FIG. 2 is a pictorial view of a transparency scanning mechanism of a CIS scanner in accordance with a first embodiment of the present invention.

FIG. 2 shows a transparency scanning mechanism of a CIS scanner in accordance with a first embodiment of the present invention. Two guide devices 30 and two driving devices 40 are mounted between the inner surface 14 of the upper cover 12 and the protective pad 16. Each of the two guide devices 30 includes a guide base 31 having a surface provided with an inclined face 32. The two guide devices 30 are respectively secured on the inner surface 14 of the upper cover 12, and are located adjacent to the two opposite ends of the plane light source 21, so that the two guide devices 30 are opposite to each other. It is appreciated that, the higher portion of the inclined face 32 of each of the two guide devices 30 is adjacent to the light permeable face 22 of the plane light source 21, and is not protruded from the light permeable face 22 of the plane light source 21.

Each of the two driving devices 40 includes two opposite gears 41. Each gear 41 is rotatable, and is arranged adjacent to the inclined face 32 of the guide device 30. The distance between two opposite gears 41 approximates the width of the transparency 61 as shown in FIG. 1. The teeth 42 of the edge of each gear 41 are slightly smaller than the through hole 62 of the edge of the transparency 61.

Figure 3:
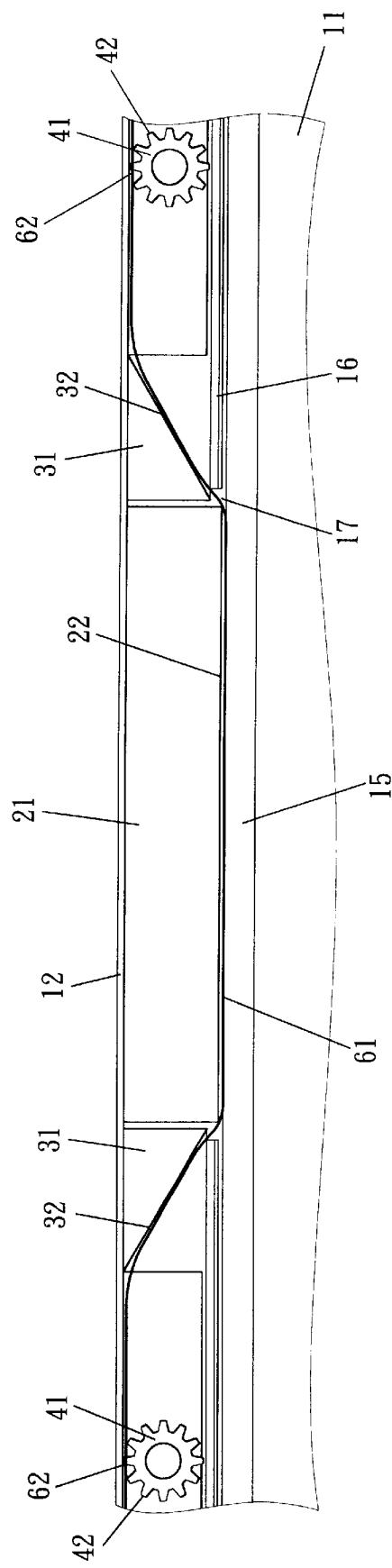
FIG. 3 is a schematic view of a use state of the transparency scanning mechanism of CIS scanner in accordance with the first embodiment of the present invention.

Referring to FIGS. 1 and 3, FIG. 3 shows a schematic view of the use state of the transparency scanning mechanism of a CIS scanner in accordance with the first embodiment of the present invention. The transparency 61 enters from one side of the protective pad 16. When the transparency 61 passes through the gear 41, the teeth 42 of the edge of each gear 41 are locked in the through hole 62 of the edge of the transparency 61. By movement of the transparency 61 and rotation of the gear 41, the transparency 61 is passed out from one side of the window 17 along the inclined face 32 of the guide base 31. The transparency 61 then crosses the light permeable face 22 of the plane light source 21, and intervenes between the inner surface 14 of the upper cover 12 and the protective pad 16 from the other side of the window 17. The transparency 61 then moves along the inclined face 32 of the other guide base 31, and is locked on the teeth 42 of the edge of the other gear 41.

Thus, the transparency 61 may be moved conveniently by guidance of the inclined face 32 of the other guide base 31. In addition, the transparency 61 may form a stable placement state by locking of the teeth 42 of the edge of each gear 41, without producing the situation of tilt and deviation. Thus, the placement of the transparency 61 may have the effect of easy operation.

When the upper cover 12 covers the body 11, the transparency 61 may be smoothly rested on the glass window 15 of the body 11 by the light permeable face 22 of the plane light source 21. Thus, the light of the plane light source 21 may penetrate the light permeable face 22 of the plane light source 21, and pass through the transparency 61 and the glass window 15 of the body 11, to proceed the image scanning.

It is appreciated that, the plane light source 21, the transparency 61, and the glass window 15 of the body 11 present a smooth resting state, so that the scanning depth may be exactly controlled within 0.3 mm. In other word, the transparency scanning mechanism of a CIS scanner in accordance with the first embodiment of the present invention may be used to conveniently scan the transparency 61 and obtain a clear image.

Figure 4:
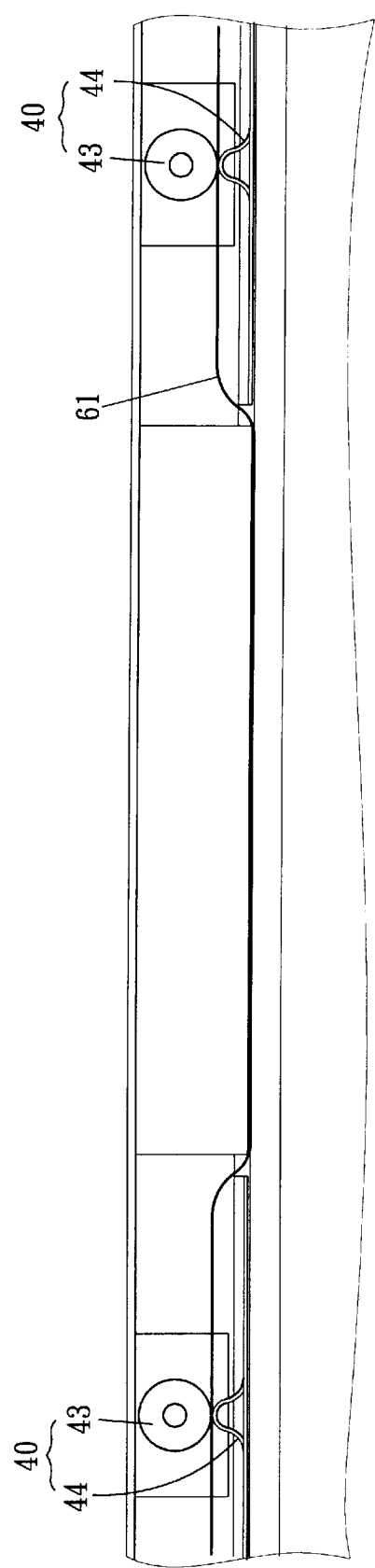
FIG. 4 shows a driving device of another embodiment of the present invention.

FIG. 4 shows the driving device 40 of the transparency scanning mechanism of a CIS scanner in accordance with another embodiment of the present invention. The driving device 40 includes a roller 43 and an elastic member 44 which are normally in contact with each other. When the transparency 61 is passed between the roller 43 and the elastic member 44, the transparency 61 may be moved conveniently by the friction between the roller 43 and the transparency 61. It is appreciated that, the roller 43 and the elastic member 44 are pressed against the edge of the transparency 61 (the position of the through hole of the transparency 61), without shading the image in the transparency 61. It is appreciated that, the roller 43 may be replaced by a gear, thereby achieving the same effect.

Figure 5:
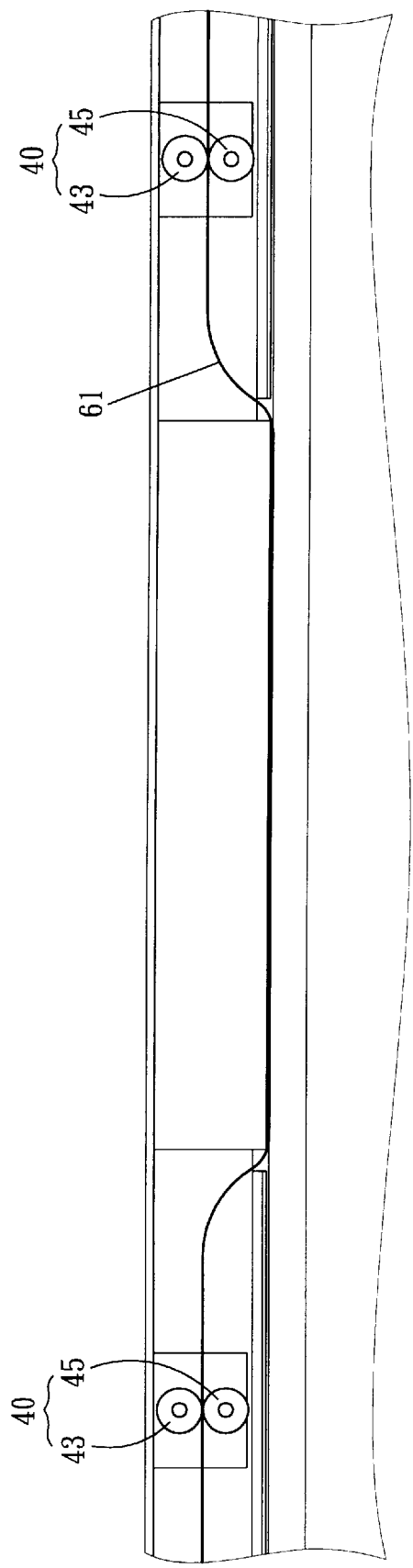
FIG. 5 shows a driving device of another embodiment of the present invention.

FIG. 5 shows the driving device 40 of the transparency scanning mechanism of a CIS scanner in accordance with another embodiment of the present invention. The driving device 40 includes two rollers 43 and 45. The transparency 61 may be passed between the two rollers 43 and 45. The two rollers 43 and 45 are pressed against the edge of the transparency 61, without shading the image in the transparency 61. Thus, the transparency 61 may be moved conveniently by the friction between the two rollers 43 and 45 and the transparency 61. It is appreciated that, the two rollers 43 and 45 may be replaced by gears having convex teeth and mating concave teeth, thereby achieving the same effect.

In the above-mentioned embodiments, the primary effect of the driving device 40 is to help movement of the transparency 61. The teeth 42 of the gear 41 may lock the through hole 62 of the transparency, the roller 43 and the elastic member 44 may clamp the transparency 61, or the two rollers 43 and 45 may clamp the transparency 61, so that the transparency 61 cannot tilt or deviate easily.

Figure 6:
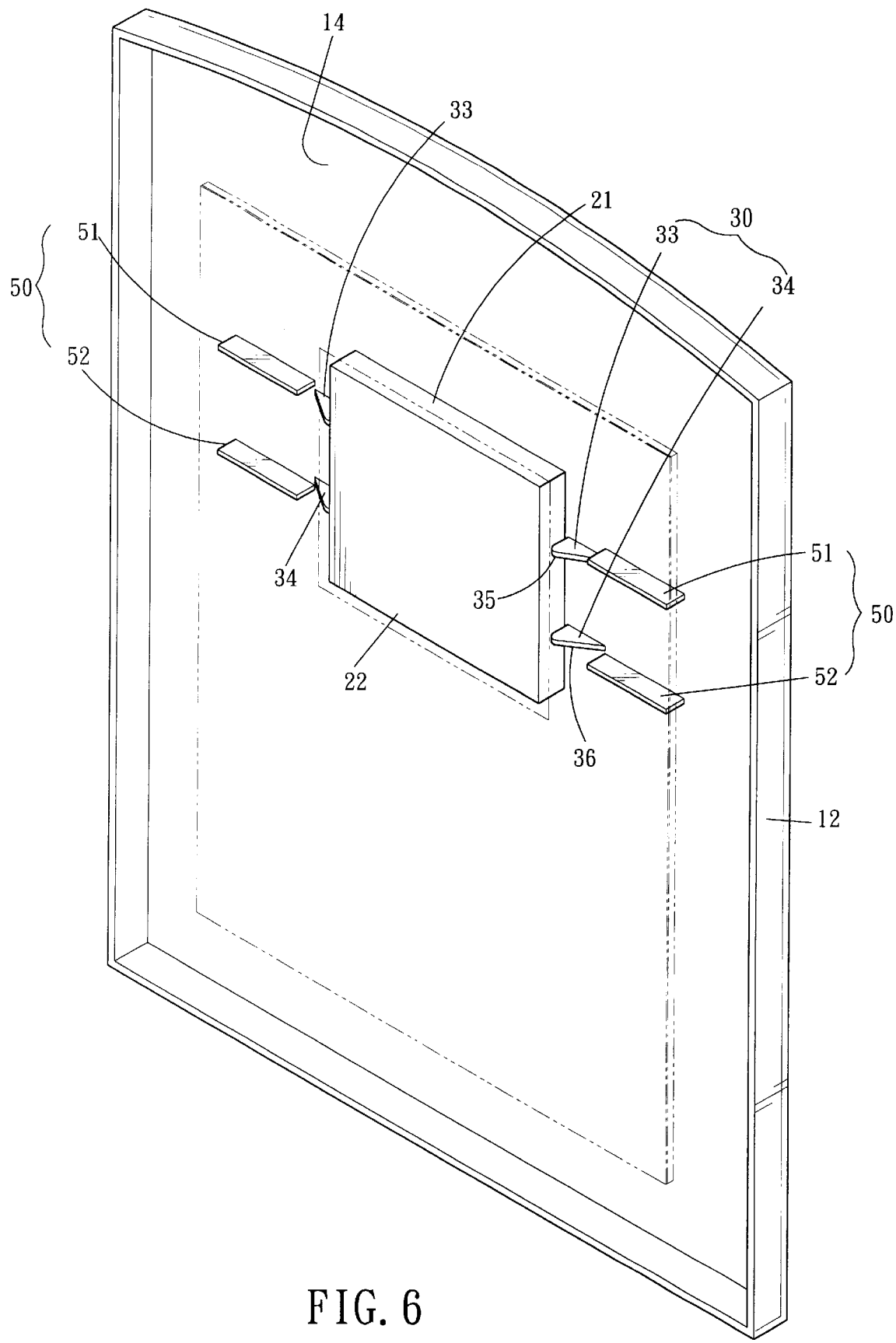
FIG. 6 is a structural view of a retaining device in accordance with the present invention.
Figure 7:
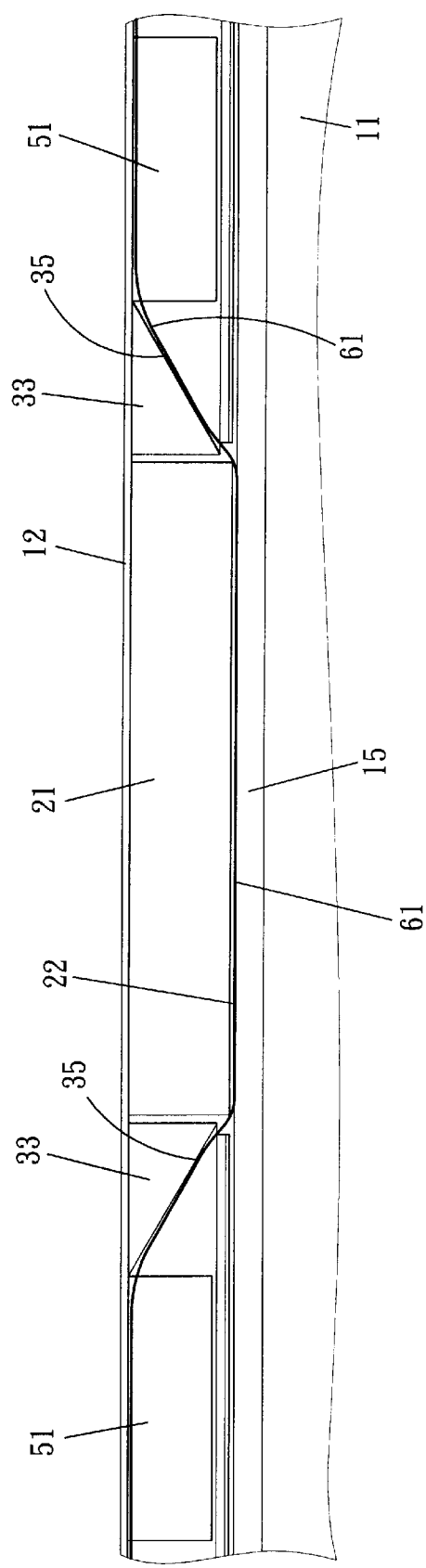
FIG. 7 is a schematic view of a retaining device in accordance with the present invention.

FIGS. 6 and 7 show the structures and the use states of the retaining device 50 of the transparency scanning mechanism of a CIS scanner in accordance with the present invention. The retaining device 50 may be located adjacent to the guide device 30, thereby preventing the transparency 61 from being tilted and deviated in the placement of the transparency 61. The retaining device 50 includes two opposite catch plates 51 and 52. The distance between the two opposite catch plates 51 and 52 is substantially equal to the width of the transparency 61. When the transparency 61 is passed between the two opposite catch plates 51 and 52, the side movement of the transparency 61 is limited apparently, without producing the situation of tilt.

In addition, the guide device 30 includes two opposite guide plates 33 and 34 each having one side formed with inclined sides 35 and 36. Each inclined side 35 and 36 has a higher end which is located adjacent to the light permeable face 22 of the plane light source 21, and is not protruded from the light permeable face 22 of the plane light source 21.

Thus, after the transparency 61 is passed through one set of opposite catch plates 51 and 52, the transparency 61 may be lifted along the inclined sides 35 and 36 of two opposite guide plates 33 and 34, and may cross the plane light source 21. Then, the transparency 61 may be lowered along the inclined sides 35 and 36 of the other set of guide plates 33 and 34, and may be passed through the other set of opposite catch plates 51 and 52.

When the upper cover 12 covers the body 11, the transparency 61 may be smoothly rested on the glass window 15 of the body 11 by the light permeable face 22 of the plane light source 21. Thus, the light of the plane light source 21 may penetrate the light permeable face 22 of the plane light source 21, and pass through the transparency 61 and the glass window 15 of the body 11, to proceed the image scanning.

In the above embodiments, the upper cover 12 may be provided with the plane light source 21. The plane light source 21, the transparency 61 and the glass window 15 of the body 11 may present a smooth resting state, so that the CIS scanner may conveniently scan the transparency 61 to obtain a clear image. The scanning mechanism such as the guide device 30, the driving device 40 and the retaining device 50 may be integrally formed with the upper cover 12. The reinforcing ribs of the upper cover 12 in the injection molding process may be further designed to have the structural state of the guide device 30 or the retaining device 50, thereby decreasing the cost of fabrication.

The guide base 31 may mate with the inclined face 32 to form the guide device 30, or the two opposite guide plates 33 and 34 may mate with the inclined sides 35 and 36 to form the guide device 30, thereby providing an inclined structure so as to mate with the plane light source 21, so that the transparency 61 may cross the plane light source 21 conveniently. Thus, the inclined face 32 and the inclined sides 35 and 36 may be defined as the guide portion.

In addition, the transparency 61 is usually referred as a colorful negative or slide. Thus, the plane light source 21 may adopt the light source of RGB that may light in turn, thereby preventing distortion of the image color obtained by the scanning process.

Referring to FIG. 1, in the embodiment of the present invention, the direction of placement of the transparency 61 is vertical to the direction of movement of the chassis 63 provided by the scanner 10 as indicated by the arrow.

Figure 8:
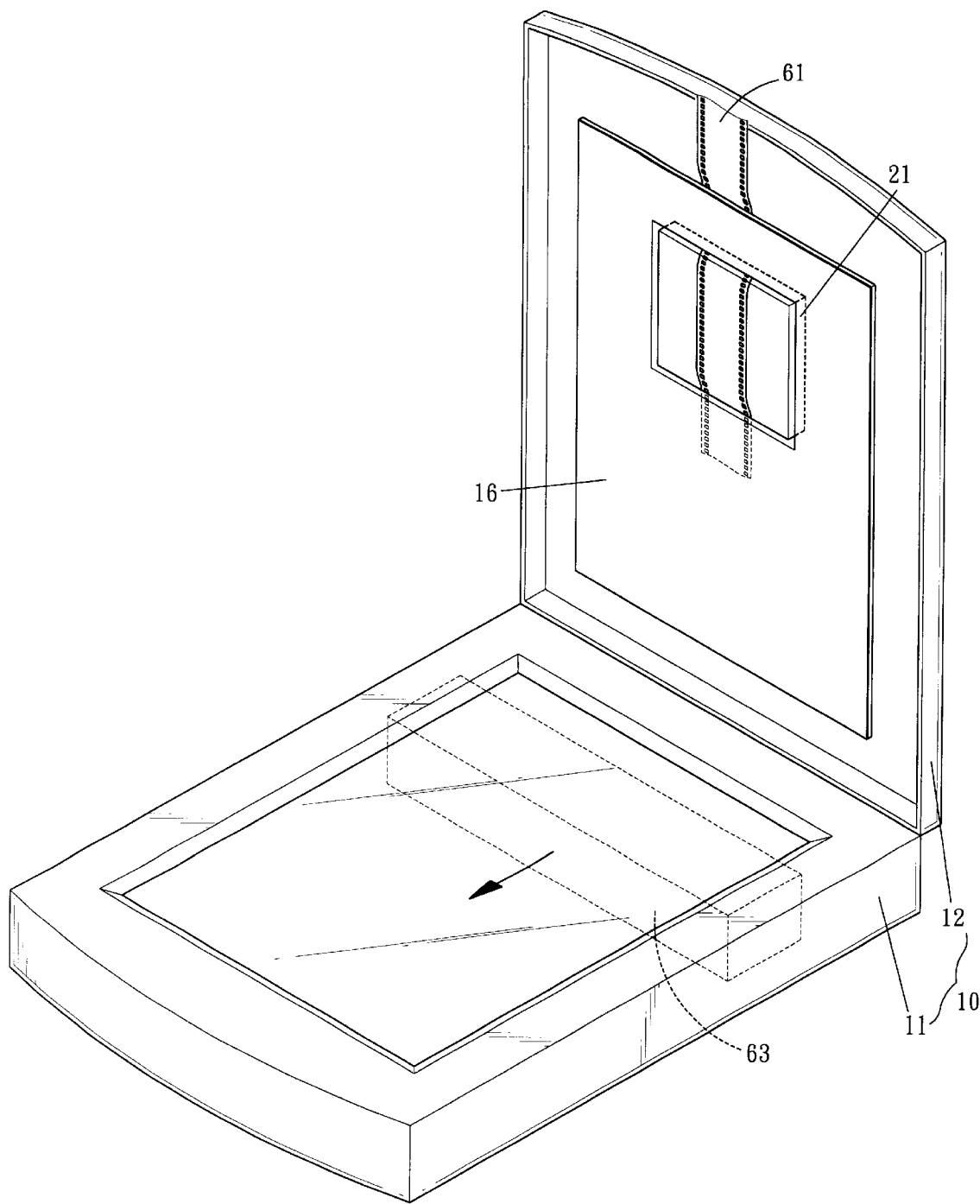
FIG. 8 is a pictorial view of a CIS scanner in accordance with a second embodiment of the present invention.

FIG. 8 shows a pictorial view of a CIS scanner in accordance with another embodiment of the present invention. The direction of placement of the transparency 61 is parallel with the direction of movement of the chassis 63 provided by the scanner 10. The guide device, the driving device and/or the retaining device are similarly mounted between the protective pad 16 and the upper cover 12, and the structure and operation thereof are similar to the above embodiments and will not be further described in detail. The position of arrangement of each device may be changed when the direction of placement of the transparency 61 is changed. That is, the direction of width of the upper cover 12 is changed to the direction of length of the upper cover 12.

While the preferred embodiments of the present invention have been shown and described, it will be apparent to those skilled in the art that various modifications may be made in the embodiments without departing from the spirit of the present invention. Such modifications are all within the scope of the present invention.

What is claimed is:

1. A transparency scanning mechanism of a CIS scanner for scanning a transparency, comprising:

an upper cover having an outer surface and an inner surface distal to the outer surface;

a plane light source secured on the inner surface of the upper cover, the plane light source having a light permeable face distal to the inner surface of the upper cover; and at least one guide device secured on the inner surface of the upper cover, and located adjacent to the plane light source, the at least one guide device having an inclined guide portion for guiding the transparency to the plane light source.

2. The transparency scanning mechanism of a CIS scanner in accordance with claim 1, further comprising a driving device located adjacent to the guide device, wherein the driving device includes gears.

3. The transparency scanning mechanism of a CIS scanner in accordance with claim 1, further comprising a driving device located adjacent to the guide device, wherein the driving device is a combination of a roller and an elastic member.

4. The transparency scanning mechanism of a CIS scanner in accordance with claim 1, further comprising a driving device located adjacent to the guide device, wherein the driving device is a combination of two rollers.

5. The transparency scanning mechanism of a CIS scanner in accordance with claim 1, further comprising a retaining device located adjacent to the guide device, wherein the retaining device includes opposite catch plates.

6. The transparency scanning mechanism of a CIS scanner in accordance with claim 1, wherein the inner surface of the upper cover is provided with a protective pad which is formed with a window for exposing the light permeable face of the plane light source, and the light permeable face of the plane light source is flush with the peripheral surface of the window.

7. The transparency scanning mechanism of a CIS scanner in accordance with claim 1, wherein the plane light source is a light source of RGB that may light in turn.

8. The transparency scanning mechanism of a CIS scanner in accordance with claim 1, wherein the guide device includes a guide plate having an inclined side.

9. The transparency scanning mechanism of a CIS scanner in accordance with claim 1, wherein the guide device includes a guide base having an inclined face.

10. The transparency scanning mechanism of a CIS scanner in accordance with claim 1, wherein the guide portion of the guide device is not protruded from the light permeable face of the plane light source.

11. The transparency scanning mechanism of a CIS scanner in accordance with claim 1, further comprising a driving device located adjacent to the guide device, wherein the driving device is a combination of a gear and an elastic member.

* * * * *